United States Patent
Page et al.

(10) Patent No.: US 7,478,153 B2
(45) Date of Patent: Jan. 13, 2009

(54) DIRECTORY-ENABLED DEVICE MANAGEMENT

(75) Inventors: Martin Page, Tustin, CA (US); Richard Alexander Wilson, Jr., Coto De Caza, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/222,757

(22) Filed: Sep. 12, 2005

(65) Prior Publication Data

US 2006/0010232 A1   Jan. 12, 2006

Related U.S. Application Data

(62) Division of application No. 09/661,030, filed on Sep. 13, 2000, now Pat. No. 7,024,476.

(51) Int. Cl.
*G06F 15/173* (2006.01)

(52) U.S. Cl. ..................................... 709/223

(58) Field of Classification Search .................. 709/223
See application file for complete search history.

(56) References Cited

U.S. PATENT DOCUMENTS

| 5,151,989 | A | * | 9/1992 | Johnson et al. ............ 707/10 |
| 5,680,552 | A | | 10/1997 | Netravali et al. ........... 709/250 |
| 5,778,394 | A | * | 7/1998 | Galtzur et al. .............. 707/205 |
| 5,845,081 | A | | 12/1998 | Rangarajan et al. ........ 709/224 |
| 6,052,724 | A | | 4/2000 | Willie et al. ............... 709/223 |
| 6,098,099 | A | * | 8/2000 | Ellesson et al. ............ 709/223 |
| 6,292,838 | B1 | | 9/2001 | Nelson ...................... 709/236 |
| 6,477,434 | B1 | * | 11/2002 | Wewalaarachchi et al. ..... 700/83 |
| 6,502,131 | B1 | | 12/2002 | Vaid et al. .................. 709/224 |
| 6,505,244 | B1 | * | 1/2003 | Natarajan et al. .......... 709/223 |
| 6,523,696 | B1 | * | 2/2003 | Saito et al. ................. 709/223 |
| 6,539,425 | B1 | | 3/2003 | Stevens et al. ............. 709/220 |
| 6,560,644 | B1 | * | 5/2003 | Lautmann et al. .......... 709/223 |
| 6,584,502 | B1 | * | 6/2003 | Natarajan et al. .......... 709/224 |
| 6,594,700 | B1 | * | 7/2003 | Graham et al. ............. 709/230 |
| 6,622,170 | B1 | | 9/2003 | Harrison et al. ............ 709/221 |
| 7,293,099 | B1 | * | 11/2007 | Kalajan ..................... 709/230 |
| 2003/0208609 | A1 | | 11/2003 | Brusca ...................... 709/230 |

OTHER PUBLICATIONS

"Implementing Directory Enabled Networks Using Windows 2000 Technology", Microsoft Corporation, http://www.microsoft.com/technet/win2000/win2kserv/technote/denuse.asp, Aug. 2000.
"Common Information Model (CIM) Core Model, Version 2.4", DMTF White Paper DSP0111, Aug. 2000.
G. Mansfield, "RFC 1567—X. 500 Directory Monitoring MIB", Jan. 1994.
N. Freed, "RFC—Network Services Monitoring MIB", Mar. 2000.

* cited by examiner

*Primary Examiner*—Jason D Cardone
*Assistant Examiner*—Thomas Duong
(74) *Attorney, Agent, or Firm*—Fitzpatrick, Cella, Harper & Scinto

(57) ABSTRACT

Managing a plurality of network devices on a network by detecting the presence of at least one of the plurality of network devices on the network by using a first communication protocol, obtaining, by using the first communication protocol, an information block from each of the detected network devices, wherein the information block contains information related to the corresponding network device, formatting each information block into a directory entry, and sending each directory entry to a directory server via a second communication protocol.

24 Claims, 8 Drawing Sheets

DIRECTORY-ENABLED DEVICE MANAGEMENT

This application is a division of application Ser. No. 09/661,030, filed Sep. 13, 2000, the contents of which are incorporated herein by reference.

BACKGROUND OF THE INVENTION

1. Field of the Invention

The invention concerns the use of a directory-enabled server to monitor and manage devices on a network enterprise. Specifically, the invention relates to the use of an LDAP directory proxy to detect and interface with legacy devices in order to incorporate such legacy devices into the directory-enabled server network management scheme.

2. Description of the Related Art

Typically, computing network environments are comprised of numerous computing devices, such as workstations and servers, and other network devices, such as printers, scanners, and the like. Maintaining and administrating these numerous computing devices and network devices in a networked environment usually requires a significant amount of time and effort by a network administrator. For example, a network administrator typically configures each network device for integration into the network by setting appropriate network information such as a server domain name and an IP (Internet Protocol) address corresponding to the network device. The network administrator also configures each network device according to its capabilities and according to the desired functionality of the network device in the networked environment.

Unlike a simple personal computer having an operating system with plug-and-play capability which can automatically recognize and configure a local peripheral, a networked environment typically requires the network administrator to manually connect and configure each new device that is added to the network. In addition, network configurations can change frequently as new network devices are connected and as existing network devices are moved around within the network. In addition, a given network device may need to be reconfigured by the network administrator in order the change the network-accessible functionality of the network device according to the needs of the network users. For example, the sorting capability of a network printer may initially have been made unavailable by the network administrator because sorting is time consuming and the printer is located in a busy office area. If the printer is later moved to a less busy office location in which sorting is desired, the network administrator would have to reconfigure the network printer in order to support the sorting capability. A network device would also be reconfigured when a new option is installed on a network device, such as the installation of an envelope feeder on a network printer. Accordingly, it can be appreciated that the level of effort required by the network administrator to configure and maintain the network devices on a network increases dramatically with the number of network devices on the network.

The administration of each network device by the network administrator is often performed locally at the location of the network device. One conventional administrative technique is for the network administrator to enter and/or select network settings and capabilities of a network device from a user interface of the network device, such as a front panel and/or keypad. Another known technique is for the network administrator to use a standardized network administration tool for remotely accessing a particular network device in order to enter and select the network settings and capabilities for the network device. For example, the network administrator may use a centralized SNMP tool to remotely access a network printer via the SNMP protocol in order to change its IP Address or to change one of its functional options, such as sorting.

Regardless of the whether the settings and capabilities of a network device are entered in the network device locally or remotely by the network administrator, the selected settings and capabilities of the network device are also typically entered by the network administrator into a centralized network location, such as a network configuration file on a network server, to publish the network settings and capabilities of the network device for access by other network devices on the network. In this manner, other network devices can become aware of, and can utilize, the shared network functionality of each particular network device. Of course, it can be appreciated that problems can arise if the configured settings and capabilities of the network device do not actually correspond to the published settings and capabilities of the network device. If the published IP address of a given network device does not match the actual IP address which was set in the network device, other network devices will be unable to access and utilize the given network device via the network.

In addition, a user at a workstation may read from the published capabilities of a network printer that it supports printing on legal-size paper and then try to send a print job to the network printer which requires legal-size paper, when the network printer actually only supports printing on standard, letter-size paper. Accordingly, the detailed and duplicative network administration tasks of configuring each network device and of entering the configured settings and capabilities of each network device into a centralized network location can become overwhelming and can result in synchronization errors between the data in the centralized network location and the actual configuration of the corresponding network device. It can be appreciated that the frequency of such discrepancies increases dramatically with a large number of network devices on the network.

One solution to the aforementioned administration problems is reflected in the recent trend towards the use of directory servers for maintaining and managing network devices within a network enterprise. Such directory-enabled management tools use a directory structure for the centralized network location in which to store and maintain the selected network settings and capabilities corresponding to each network device in the network enterprise. A separate entry is provided within the directory structure to contain the aforementioned information related to each network device. The entries are organized in the directory structure in a hierarchical fashion wherein the directory structure has separate branches for each type of network device. For example, the directory structure would have a branch for network printers, a branch for network computers and other branches for other types of network devices, wherein the branch for network printers has a sub-branch for ink jet printers, a sub-branch for laser jet printers and a sub-branch for dot matrix printers. The sub-branch for ink jet printers would have a plurality of entries for storing the selected settings and capabilities corresponding to each of the ink jet printers on the network.

Preferably, a standardized schema is utilized to define the format for each entry in the directory structure, thereby providing a uniform format for containing the network settings and capabilities of each network device. In this manner, the directory structure residing on a directory-enabled server provides a centralized location in which the network settings and capabilities of each network device is published for access by all other network devices. Access to such directory-enabled servers is typically implemented via some type of standardized directory protocol for efficient publication and retrieval of information to and from the directory structure. Examples of such protocols are the x.500 directory access protocol and its lightweight relative, the Lightweight Directory Access Protocol (LDAP). The use of such a directory-enabled server to maintain and manage network devices in a network enterprise provides a very efficient network management scheme when coupled with a directory-enabled management tool which provides an interface for a user, such as a network administrator, to access and modify the information in the directory structure of the directory-enabled server. Such a directory-enabled management scheme would preferably utilize LDAP over x.500 for a communication protocol with the directory-enabled server because LDAP generally creates less network traffic than x.500.

The use of a directory-enabled network management scheme can significantly reduce the time and complexity required for the network administration of all network devices on a network enterprise. For example, a directory-enabled management tool can utilize standard directory functions such as complex queries, batch mode operations, and generalized entry modifications, in order to manage and modify entries within the directory structure of the directory-enabled server on a large scale. Therefore, network devices in a network enterprise having a directory-enabled server can be centrally managed and accessed anywhere on the network by accessing the directory-enabled server with a directory-enabled client, such as a directory-enabled management tool.

For example, a network administrator can efficiently access and modify a common group of network devices via directory query and modify commands from a remote location via the internet. It can be appreciated that such network management capabilities can greatly increase the efficiency of network management in large-scale network environments. In addition, directory-enabled network management schemes provide for the extension of the capabilities of the network devices over a larger network enterprise, such as the internet. Accordingly, it can be appreciated that a large-scale network enterprise may have several directory-enabled servers distributed across various networks which comprise the overall network enterprise, in order to manage the network enterprises within the domain of each particular network.

The trend towards the use of directory-enabled servers for network management has been reflected in the efforts of the Desktop Management Task Force (DMTF), and specifically in the Directory Enabled Network (DEN) initiative and the Common Information Model (CIM) initiative. These efforts have focused on the broad concept of using directory structures for the management of network devices on a network, and on creating a common data format for representing network elements on a network within the data structure of a directory-enabled server. The DMTF, DEN and CIM initiatives, however, have not provided solutions to the problems associated with implementation of a directory structure for managing network devices in a network enterprise. Specifically, the use of a directory-enabled server to manage network devices raises problems similar to those of the traditional approach to network management regarding how the information related to each network device is entered and maintained in the directory structure. It is desirable to reduce the effort required by a network administrator to enter and update information related to each network device within the directory structure. Accordingly, an implementation of a directory-enabled network management scheme is needed which provides a mechanism for efficient publication of entries corresponding to each network device into the directory structure.

In addition, problems can arise with the use of a directory-enabled network management scheme when mismatches occur between the actual network settings and capabilities of the network device and the published network settings and capabilities in the entry of the data structure corresponding to the network device. These mismatches can occur because changes to the network settings and capabilities of the network device may be made manually at the network device, via a conventional SNMP network management tool, or may be made directly to the entry in the directory structure by a user, such as a network administrator. Accordingly, an implementation of a directory-enabled management scheme is needed which provides reliable synchronization between the network settings and capabilities published in the entry of the directory structure and those of the network device itself, regardless of where the changes to the settings are made.

Lastly, the implementation of a directory-enabled network management scheme generally assumes that all network devices in the network enterprise are directory-enabled in order to support the directory-enabled server. For this assumption to be correct, each network device must have the ability to communicate via the selected directory protocol, such as LDAP, and must also have appropriate logic in order to support the directory-enabled management functions. Such a network management scheme does not take into account the large number of legacy network devices currently in use which do not have the capability to communicate using a directory protocol, such as LDAP, and which to not have logic incorporated to support such directory-enabled network management functions. Given that these legacy devices will still be useful for many years to come, it is preferable for a directory-enabled network management scheme to accommodate such legacy devices in a mixed, heterogeneous, network enterprise which includes both directory-enabled network devices and legacy devices. Accordingly, a directory-enabled network management scheme is desired which resolves the foregoing problems.

SUMMARY OF THE INVENTION

The present invention addresses the foregoing problems by providing a directory-enabled network management scheme in which legacy devices are automatically discovered, and information related to the settings and capabilities of each legacy network device is obtained by utilizing the legacy protocol, such as SNMP. The set of information corresponding to each legacy network device is then formatted into a data entry and the data entry is forwarded to a directory server via a directory communication protocol, such as LDAP. The directory-enabled network management scheme of the present invention provides for synchronization of the settings and capabilities of each network device with the corresponding entry in the directory server by monitoring for changes in both the network devices and their corresponding directory entries. In this manner, a directory-enabled network management scheme is provided which reduces the effort required by a network administrator to manage the network devices, and which manages a heterogeneous network enterprise having both directory-enabled network devices and legacy network devices.

Accordingly, one aspect of the invention concerns the management of a plurality of network devices on a network by detecting the presence of at least one of the plurality of network devices on the network by using a first communication protocol, obtaining, by using the first communication protocol, an information block from each of the detected network devices, wherein the information block contains information related to the corresponding network device, formatting each information block into a directory entry, and sending each directory entry to a directory server via a second communication protocol.

Preferably, the communication protocol used to communicate with the directory server is LDAP, and the communication protocol for communicating with the legacy network devices is SNMP. In addition, the information block from each of the detected network devices preferably includes network setting data, such as an IP address, in addition to network capabilities, such as print speed, paper types and the like. The format of each directory entry is preferably a standardized schema for consistency among directory entries.

By virtue of the foregoing, a directory-enabled network management scheme is provided which supports both legacy network devices and directory-enabled devices in a network enterprise. In this manner, the present invention provides a directory proxy which extends LDAP support to the legacy network devices for inclusion in the directory-enabled network management scheme. In addition, synchronization capability provides for reliable consistency between the settings and capabilities of each network device and the settings and capabilities published in the corresponding directory entry.

According to another aspect, the invention concerns the management of a plurality of network devices on a network by detecting the presence of at least one of the plurality of network devices on the network by using a first communication protocol, obtaining, by using the first communication protocol, an information block from each of the detected network devices, wherein the information block contains information related to the corresponding network device, formatting each information block into a separate directory entry, and sending each directory entry to a directory server by using a second communication protocol. The management further includes monitoring, by using the first protocol, each of the detected network devices for an update of the information in the information block of the network device, and obtaining, in the case that the information in the information block of one of the detected network devices has been updated, the updated information of the information block from the corresponding network device by using the first communication protocol, and sending the updated information to the directory server by using the second communication protocol for placement into the directory entry for the corresponding network device. In addition, the management includes monitoring, by using a third communication protocol, for issuance of an update message from the directory server indicating that a directory entry has been updated in the directory server, and obtaining, in the case that an update message is issued, the updated directory entry from the directory server by using the second communication protocol, extracting updated data from the updated directory entry, and sending the updated data to the network device which corresponds to the updated directory entry for placement into the information block of the corresponding network device.

Preferably, the communication protocol used to communicate with the directory server is LDAP, and the communication protocol for communicating with the legacy network devices is SNMP. In addition, the information block from each of the detected network devices preferably includes network setting data, such as an IP address, in addition to network capabilities, such as print speed, paper types and the like. The format of each directory entry is preferably a standardized schema for consistency among directory entries. In addition, the monitoring of the detected network devices for updated information is preferably performed on a frequent basis. Lastly, the issuance of an update message from the directory server is preferably provided by a directory plug-in which issues an update message using a standard IP protocol.

By virtue of the foregoing, a directory-enabled network management scheme is provided which supports both legacy network devices and directory-enabled devices in a network enterprise. In this manner, the present invention provides a directory proxy which extends LDAP support to the legacy network devices for inclusion in the directory-enabled network management scheme. In addition, synchronization capability provides for reliable consistency between the settings and capabilities of each network device and the settings and capabilities published in the corresponding directory entry.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
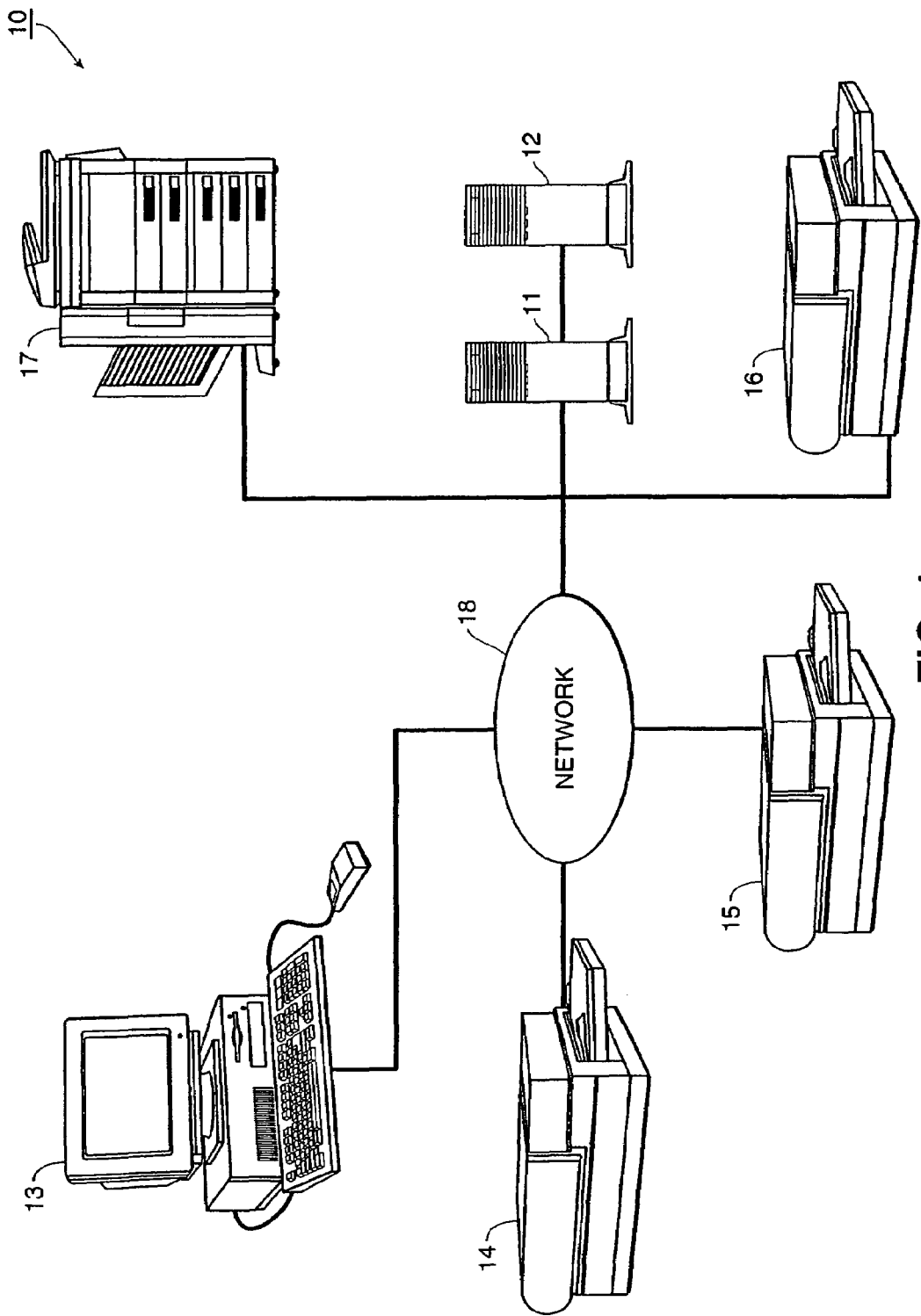
FIG. 1 is an view of a network system in which the invention may be employed.

FIG. 1 depicts a network environment in which the invention may be employed. As seen in FIG. 1, network 10 may include servers 11 and 12, client workstation 13, and peripheral devices 14, 15, 16 and 17 connected to network 18. Network connection 18 may be a local area network (LAN), a wide area network (WAN), or any other type of network. Of course, the invention is not limited to the network shown in FIG. 1 and many other devices may be included within the network environment. For instance, network 10 may include routers, additional computer workstations, additional servers, and additional peripheral devices. Therefore, since virtually an unlimited number of devices could be included within network 10, FIG. 1 merely depicts a few of the devices that may be included for the sake of brevity.

Client workstation 13 is preferably a computer workstation and may be, for example, an IBM-compatible personal computer, a Macintosh personal computer, a UNIX workstation, a Sun MicroSystems workstation, or any other type of workstation. Client workstation 13 preferably includes an LDAP client application program that allows users to access a directory server application program in servers 11 and/or 12, and to make changes in the directory server application (hereinafter referred to as a "directory server". Some examples of directory server application programs are Microsoft Active Directory Server, Netscape Directory Server and Novell Directory Server. Of course, these are merely examples of some directory server application programs that may be utilized in practicing the invention and the invention is not limited to these particular applications, but may be implemented with any directory server application. Client workstation 13 is also preferably capable of communication utilizing a TCP/IP protocol. As will be described below, TCP/IP is utilized for receiving multicast messages that are multicast by a plug-in in the directory server.

The LDAP client application program in client workstation 13 communicates with the directory server application running in servers 11 and 12 via network 18. Communication between client workstation 13 and the directory server in servers 11 and 12 will be described in more detail below with regard to FIG. 3. Additionally, the LDAP client application program receives and processes multicast messages that are multicast by a multicast plug-in of the directory server in servers 11 and 12. It should be noted that the LDAP client application in client workstation 13 may be configured to either allow a user to make changes in the directory server, but not to receive multicast messages from the multicast plug-in, to only receive multicast messages from the multicast plug-in, but not to allow a user to make changes in the directory server, or to allow user to make changes in the directory server and to also receive multicast messages. Additionally, it is not necessary that the LDAP client application in client workstation 13 correspond to the directory server application in servers 11 and 12 in order for the LDAP client application to be able to make changes in the directory server. That is, if the directory server application in servers 11 and 12 is Netscape Directory Server, the LDAP client application in client workstation 13 does not have to be a Netscape Directory Server LDAP client in order for a user to make changes in the directory server. Since the communication between the LDAP client and the directory server is being performed with the LDAP protocol, any LDAP client application could be utilized in client workstation 13 to make changes in the Netscape Directory Server in servers 11 and 12.

An LDAP client application in client workstation 13 is not the only way to make changes in the directory server application in servers 11 and 12. Changes could also be made in the directory server in servers 11 and 12 via a native application in servers 11 and 12 themselves. Additionally, changes could be made by an embedded LDAP client within a device on the network, or via a directory proxy. Accordingly, the invention does not require that changes be made in the directory server by an LDAP client application in client workstation 13 and it is an object of the invention to manage communication between various different types of devices on the network and the directory server for changes made in the directory server.

Peripheral devices 14, 15, 16 and 17 may be any type of peripheral device that may be included within network 10. That is, they may be printers, copiers, facsimiles, routers, etc., and although FIG. 1 depicts them as being printers and copiers, they are not limited to such. However, for the sake of brevity, peripheral devices 14, 15 and 16 will be described as printers and peripheral device 17 will be described as a network copier.

It can readily be recognized that various types of printers and copiers may be included within network 10. For instance, network 10 may include some printers that include newer network communication technology and some that include older network communication technology. That is, some of the printers may include the latest technology that provides the ability to communicate with the directory server directly. This type of printer may include an embedded LDAP client. On the other hand, some of the printers on the network may be older printers, such as a legacy printer, that communicate via SNMP and do not have the ability to communicate with the directory server directly. As such, this type of printer may require an intermediary device to be able to communicate with the directory server utilizing the LDAP protocol. Moreover, some of the printers on the network may be hybrid devices that include both an embedded LDAP client that can communicate directly with the directory server utilizing the LDAP protocol, and also include an SNMP client that requires an intermediary for communicating with the directory server. For the sake of brevity, in network 10, printer 14 is assumed to be a printer that includes an embedded LDAP client that communicates directly with the directory server, printer 16 and copier 17 are assumed to be a legacy printer and a legacy copier, respectively, and therefore communicate utilizing SNMP, and printer 15 is assumed to be a hybrid printer that includes an embedded LDAP client and also communicates utilizing SNMP.

Figure 2:
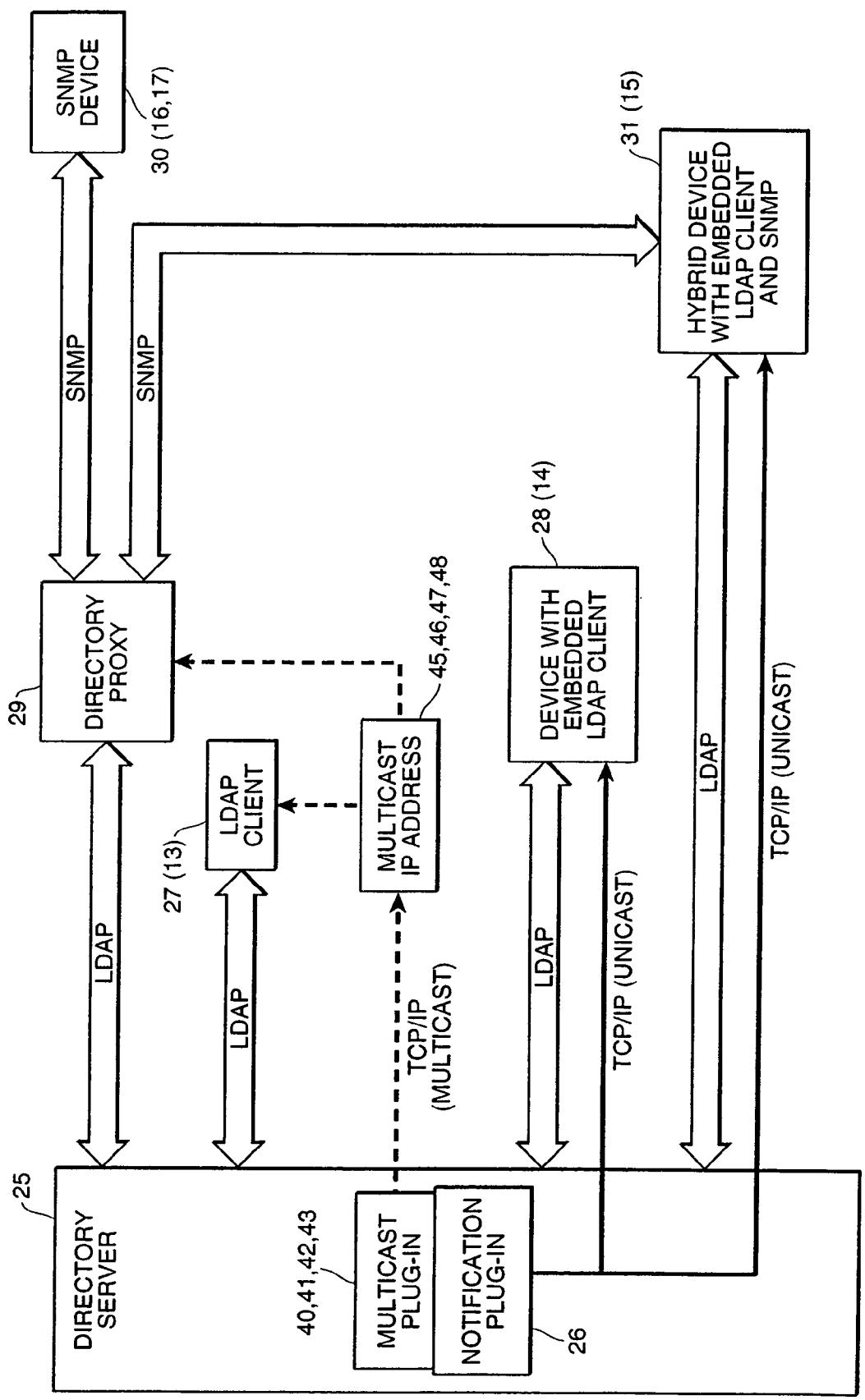
FIG. 2 depicts an architecture of communication between devices on the network of FIG. 1.

FIG. 2 depicts an architecture of the communication protocols between each of devices 13 to 17 and the directory server in, for example, server 11. As seen in FIG. 2, directory server 25 communicates with LDAP client 27, embedded LDAP client device 28, directory proxy 29, and hybrid device 31 utilizing the LDAP protocol. LDAP client 27 may be, for example, an LDAP client application as described above running in client workstation 13. Thus, LDAP client 27 communicates directly with directory server 25 for making changes in the directory server. Embedded LDAP client 28 and hybrid device 31 may be printers, such as printers 14 and 15 respectively, that each include an embedded LDAP client. One difference between embedded LDAP client 28 and hybrid device 31 may be that hybrid device 31 also includes the capability of performing communication via SNMP while embedded LDAP client 28 communicates via LDAP alone. Directory proxy 29 communicates with directory server 25 via LDAP for making changes in directory server 25 and acts as an intermediary, or translator between SNMP device 30 and hybrid device 31 with directory server 25. Directory proxy 29 will be discussed in more detail below.

Directory server 25 also includes plug-ins 26 and 40 to 43. Plug-in 26 is a notification plug-in and will be described in more detail below, but briefly, notification plug-in 26 is called by directory server 25 whenever a change is made in directory server 25. When the notification plug-in is called, it manages notification processes for notifying the appropriate devices on the network of the change. For instance, notification plug-in 26 may send out a unicast message to LDAP enabled devices on the network, or it may call one of the multicast plug-ins (40 to 43) for sending a multicast message. When multicast plug-ins 40 to 43 are called by notification plug-in 26, they generate an information packet about the change made in directory server 25 and multicast the packet to a multicast IP address. Multicasting and unicasting will be described in more detail below.

Figure 3:
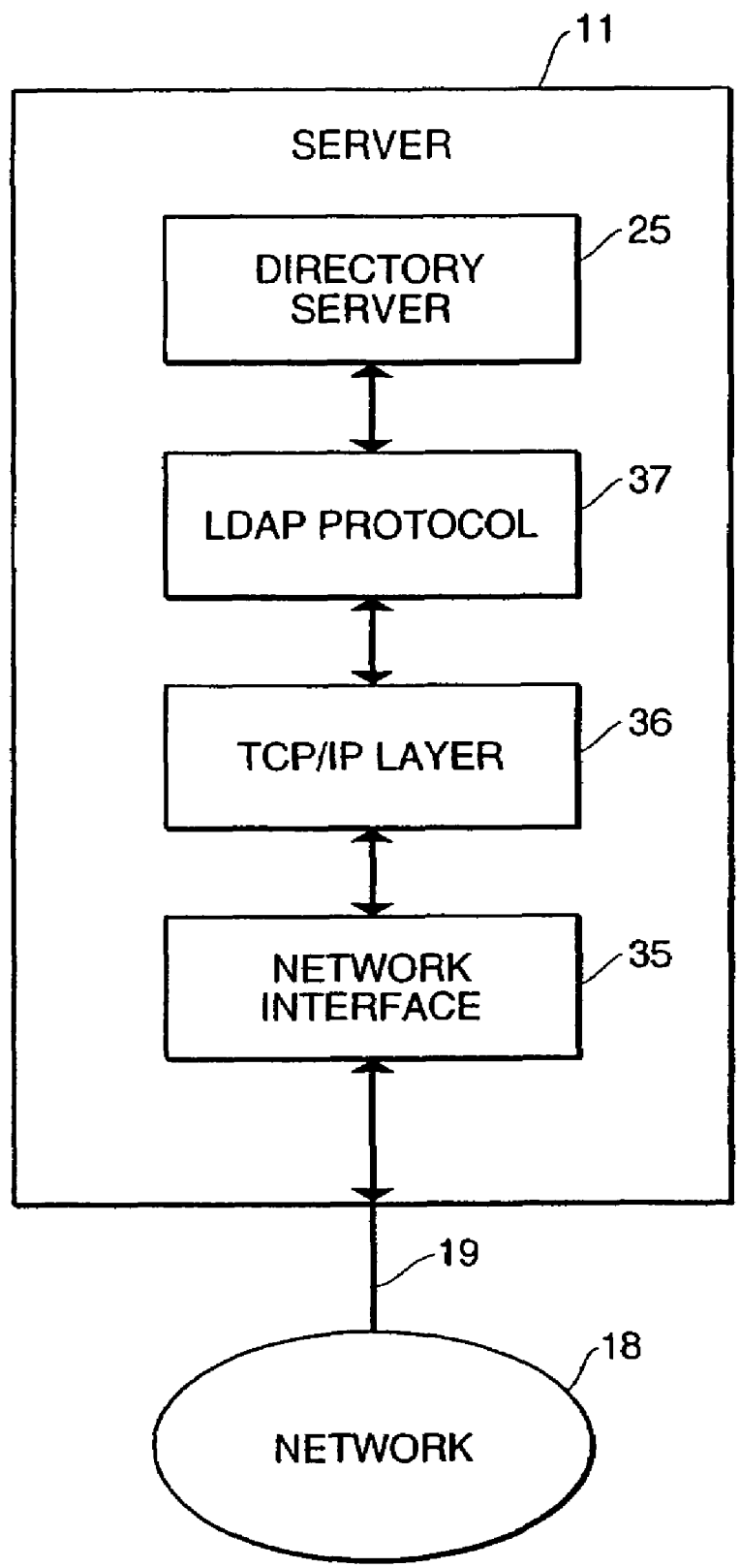
FIG. 3 depicts an internal architecture of a server shown in FIG. 1.

FIG. 3 depicts a more detailed view of the internal architecture of server 11. Server 12 may be similar to server 11 and for brevity, only server 11 will be discussed. Server 11 may be a server such as a Compaq Prosignia server or any other type of server. However, server 11 does not have to be a server per se, but may be any computer that is capable of running a directory server application program. As shown in FIG. 3, server 11 is connected to network 18 by connection 19 which is interfaced to network interface 35. Network interface 35 is preferably a network card which controls transmission and reception of information by server 11 over the network. Interfaced with network interface 35 is TCP/IP layer 36. TCP/IP is the preferred protocol for performing unicasting and multicasting, but any other protocol could be used instead. For a better understanding of unicasting and multicasting using TCP/IP, consider the following.

There are generally three different categories of IP addresses: communication, broadcast and multicast. For the present discussion, only communication and multicast are pertinent and therefore, a discussion of broadcast will be omitted. For communication, a range of IP addresses are assigned that are utilized to specifically identify each device on the network. For example, each device attached to the network shown in FIG. 1 would be assigned a different IP address that identifies that device on the network. Each device may be manually assigned an IP address that it maintains, or an IP address may be automatically assigned by an application program each time the device is connected to the network. Therefore, in performing unicasting, the IP address of each device that is to receive an information packet from the directory server plug-in 26 is setup in the plug-in configuration. As such, when the notification plug-in generates an information packet after a change has been made in the directory server, it transmits the packet to each device on the network that has been setup in the notification plug-in configuration.

In multicasting, a range of IP addresses are assigned in which messages transmitted to one of the IP addresses are received only by members who have registered with the IP address. Unlike the communication IP addresses, the IP addresses in the multicast range are not assigned to a specific device. Rather, they are virtual addresses that represent a multicast group that receives messages sent to it and which then distribute the received messages to members who have registered with the group. Thus, information packets are multicast by the directory server multicast plug-ins to a designated multicast group whereby they are distributed to registered members of the group.

Returning to FIG. 3, interfaced to TCP/IP layer 36 is LDAP protocol layer 37. LDAP protocol layer 37 provides for communication between an LDAP client and the directory server, such as directory server 25 in server 11. The LDAP protocol layer is utilized to communicate with directory server 25 regardless of whether the LDAP client performing a change in the directory server is an LDAP client in client workstation 13, an embedded LDAP client in embedded LDAP client 28 or hybrid device 31, or an LDAP client in directory proxy 29. Thus, utilizing the LDAP protocol, an LDAP client can make changes in a directory server.

Figure 4:
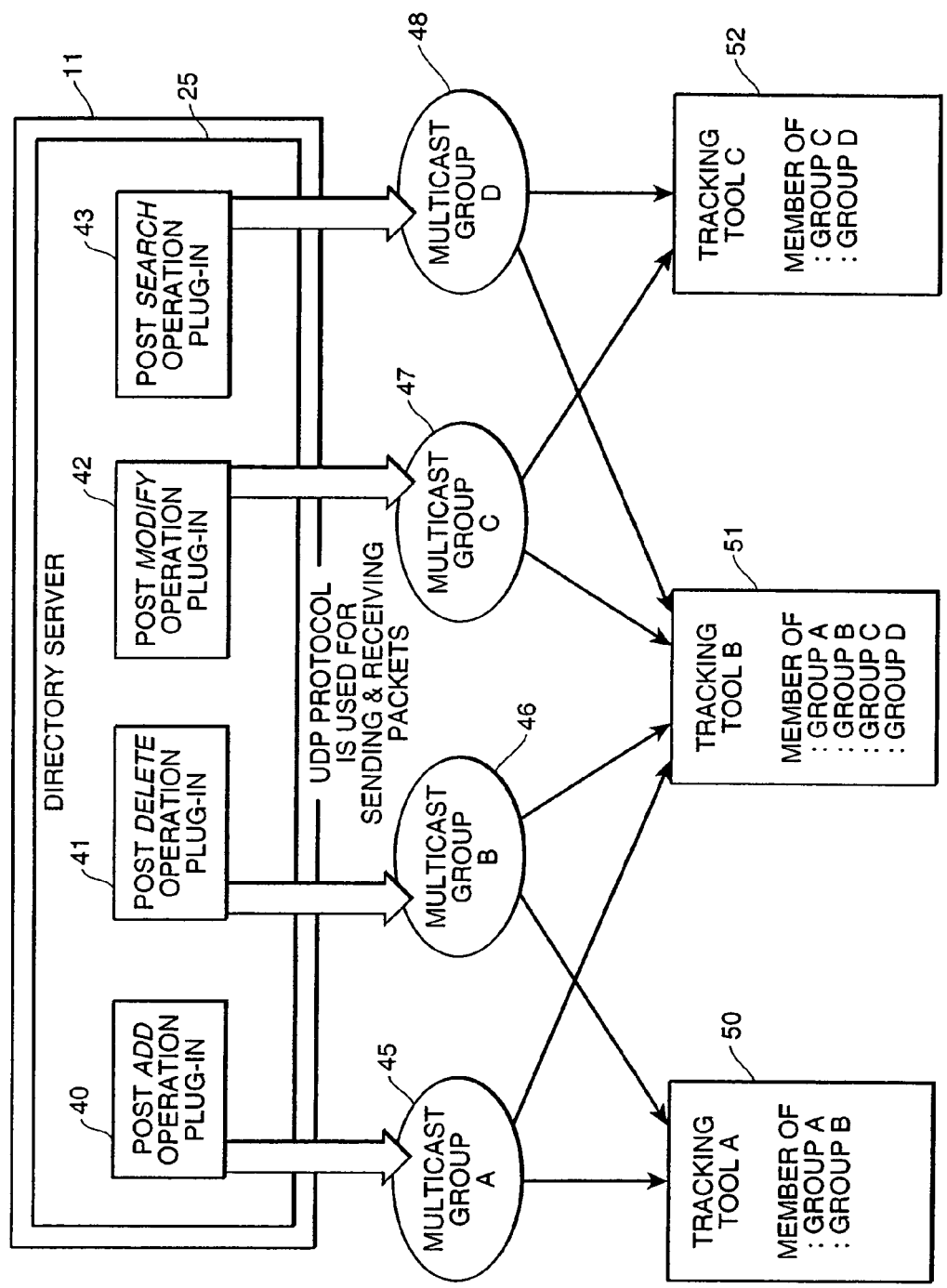
FIG. 4 depicts an architecture of a directory server that utilizes plug-ins.

FIG. 4 depicts an example of an architecture of a messaging system and flow of multicast messages from server 11 to clients that have registered as members of at least one multicast group. FIG. 4 only depicts an architecture for performing multicasting and unicasting will be described in more detail below. The messaging system of FIG. 4 preferably uses a plug-in feature of the directory server application program. That is, when a change is made in the directory server, and the notification plug-in determines that a multicast message is to be sent out, the directory server calls the multicast plug-in which generates an information packet and multicasts it to a multicast group. However, a plug-in is not required and any other implementation which generates multicast information packets and multicasts them to a corresponding multicast group could be employed. In the present discussion, plug-ins that are supported as part of Netscape Directory Server will be described, although plug-ins particular to other applications may be implemented similarly.

As seen in FIG. 4, four types of multicast plug-ins may be implemented in Netscape Directory Server 25: ADD plug-in 40, DELETE plug-in 41, MODIFY plug-in 42, and SEARCH plug-in 43. One type of plug-in supported by Netscape Directory Server are post-operation plug-ins. As such, each of the foregoing multicast plug-ins for Directory Server 25 are preferably implemented as a post-operation plug-in. A post-operation plug-in is one in which, after an operation has been performed (i.e. post-operation), the appropriate plug-in is called. Accordingly, when a change is made in the directory server, the directory server calls the appropriate multicast plug-in corresponding to the type of change made. That is, if a new object was added in the directory server, then the directory server would call an ADD plug-in. When the ADD plug-in is called, it generates an information packet about the ADD change and multicasts it to a multicast group corresponding to the type of change, whereby registered members of the multicast group receive the information packet.

To send the information packet by multicasting, multicast addresses corresponding to each of the plug-ins are established. As such, each multicast plug-in has a corresponding multicast address that it sends the information packet to. For example, as seen in FIG. 4, ADD plug-in 40 sends information packets to multicast group 45 that is designated to receive the ADD information multicast packets. Likewise, DELETE plug-in 41 has corresponding multicast group 46, MODIFY plug-in 42 has corresponding multicast group 47 and SEARCH plug-in 43 has corresponding multicast group 47. An example of multicast IP addresses for each of the foregoing multicast groups may be as follows:

| Operation/Multicast Group | IP Address |
| --- | --- |
| ADD Operation (multicast group 45): | 225.6.7.8 |
| DELETE Operation (multicast group 46): | 225.6.7.9 |
| MODIFY Operation (multicast group 47): | 225.6.7.10 |
| SEARCH Operation (multicast group 48): | 225.6.7.11 |

When changes are made in the directory server by the LDAP client, the notification plug-in calls the appropriate multicast plug-in, if required, whereby the multicast plug-in generates an information packet and multicasts the packet over the network to its corresponding multicast IP address.

In order to receive the multicast messages, members register with each multicast group corresponding to the type of change information packet that they wish to receive. For example, as seen in FIG. 4, client 50 registers as a member of multicast groups 45 and 46. Therefore, it receives multicast messages corresponding to ADD and DELETE operations performed in directory server 25. Client 51 registers with multicast groups 45, 46, 47 and 48 and therefore receives multicast messages about ADD, DELETE, MODIFY and SEARCH operations performed in directory server 25. Client 52 registers as a member of multicast groups 47 and 48 and therefore only receives multicast messages relating to MODIFY and SEARCH operations performed in directory server 25. In the present discussion, directory proxy 29 may register as a member of each of the foregoing multicast groups.

Thus, as described above, an LDAP client interfaces with the directory server to make changes in the directory server, the directory server calls a notification plug-in that, when required, calls a multicast plug-in corresponding to the type of change made, the multicast plug-in generates a post-operation information packet and multicasts it over the network to a multicast group corresponding to the type of change, and clients who have registered with the multicast group receive the multicast message.

For unicasting, notification plug-in 26 would be configured to send a change information packet for a change operation performed on a specific LDAP enabled device on the network at an appropriate time. For example, notification plug-in 26 may be configured so that when a change is initiated by the directory server for a directory entry of an LDAP enabled device, it generates an information packet and unicasts it to the device. Notification plug-in 26 only sends a unicast message to the particular device that was changed in the directory server and not to other devices on the network. For instance, if the configuration of printer 14 were changed in directory server 25, notification plug-in 26 would unicast a message only to printer 14 and not to printer 15 (which is a hybrid printer that is also LDAP enabled). However, as will be described below, one caveat with unicasting is that, before the notification plug-in sends the unicast message, it first determines what LDAP client performed the change operation. That is, if the LDAP client in printer 14 initiated the change, then the plug-in would not send a unicast message to printer 14 informing it of the change since it was the LDAP client in printer 14 that initiated the change. However, if the change was initiated by the LDAP client in client workstation 13, then the notification plug-in would send a unicast message to printer 14 to inform it of the change since the change was not initiated by the LDAP client in printer 14.

Figure 5:
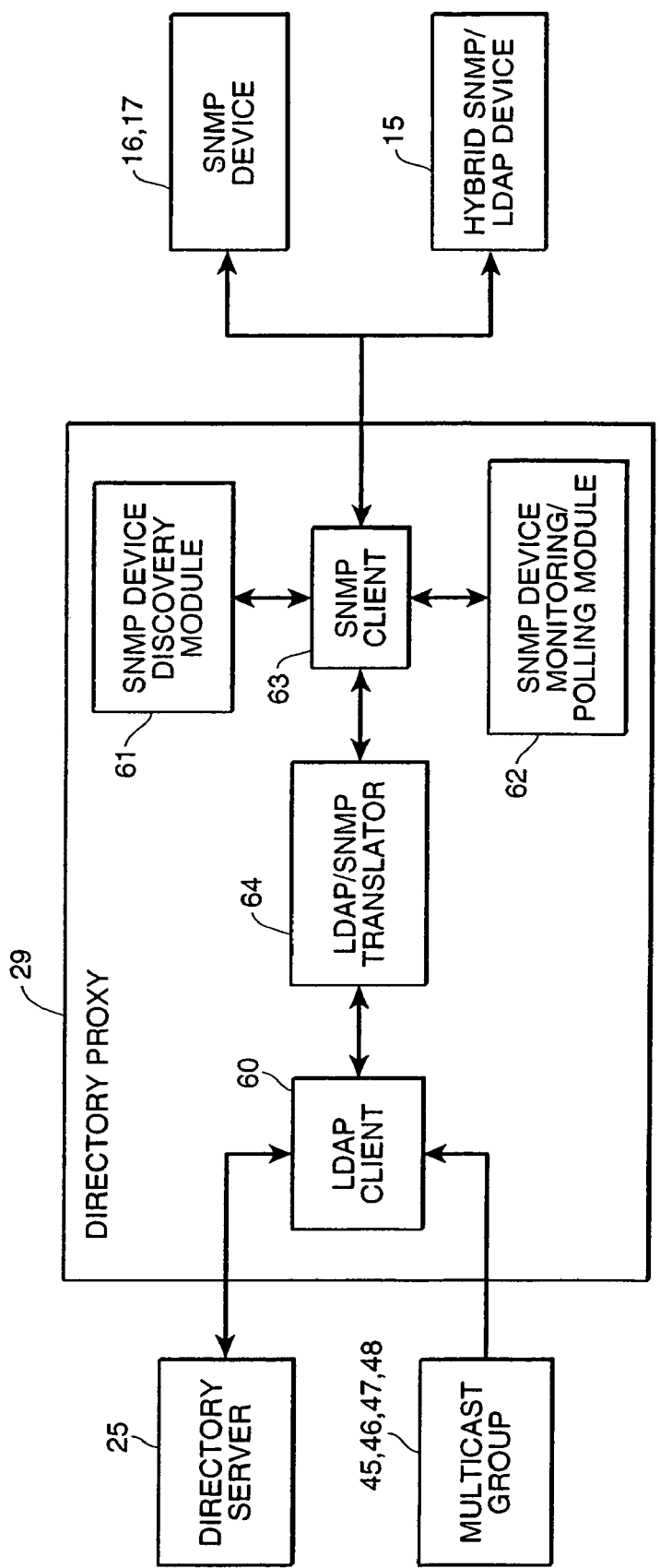
FIG. 5 depicts a more detailed configuration of the internal architecture of a directory proxy and its communication with various devices on the network.

FIG. 5 depicts a more detailed configuration of the internal architecture of directory proxy 29 and its communication with various devices on the network. As shown in FIG. 5, directory proxy 29 includes LDAP client 60, SNMP device discovery module 61, SNMP device monitoring/polling module 62, SNMP client 63 and LDAP/SNMP translator 64. LDAP client 60 communicates with directory server 25 utilizing the LDAP protocol for performing changes in directory server 25 and for receiving LDAP commands from directory server 25 that are to be translated and sent to SNMP enabled devices on the network. LDAP client 60 also receives multicast messages from various multicast groups, such as multicast groups 45 to 48 described above with regard to FIG. 4. Additionally, LDAP client 60 receives LDAP commands from, and sends LDAP commands to LDAP/SNMP translator 64.

SNMP client 63 communicates with all SNMP enabled devices on the network, including legacy (SNMP) printer 16 and hybrid (SNMP/LDAP) printer 15. SNMP client 63 sends SNMP commands to, and receives SNMP commands from all SNMP enabled devices on the network. Additionally, SNMP client 63 communicates with SNMP discovery module 61 and SNMP device monitoring/polling module 62 to transmit messages between modules 61 and 62 and all SNMP enabled devices on the network. Further, SNMP client 63 communicates with LDAP/SNMP translator 64 to send SNMP commands to, and to receive SNMP commands from the translator. LDAP/SNMP translator formats SNMP commands received from SNMP client 63 into LDAP format and sends the LDAP commands to LDAP client 60. Additionally, LDAP/SNMP translator 64 receives LDAP commands from LDAP client 60, formats them into SNMP commands, and sends them to SNMP client 63.

SNMP device discovery module 61 performs query operations through SNMP client 63 to obtain information about all SNMP devices on the network. Additionally, SNMP device discovery module 61 receives responses to the queries from all SNMP devices on the network and sends SNMP commands to SNMP client 63 based on the responses. SNMP device monitoring/polling module 62 also performs query operations through SNMP client 63 to obtain information about all SNMP devices on the network. One difference between modules 61 and 62 is that module 61 generally performs queries on startup of the directory proxy, whereas, module 62 generally performs periodic queries after startup to obtain update information from all of the SNMP enabled devices. The operations of modules 61 and 62 will be discussed in more detail below.

Generally, there are three different types of devices that are connected to network 18, a device with an embedded LDAP client, an SNMP device that does not have an embedded LDAP client, and a hybrid device that is both an SNMP device and also has an embedded LDAP client. Each of the devices on the network, their configuration information is maintained in a directory entry in directory server 25. That is, directory server 25 includes a directory of all SNMP enabled devices, all embedded LDAP client devices and all hybrid devices. The directory entry is generally formatted according to a standardized schema and may include a schema extension. The standardized schema includes a source flag that indicates the source of changes made in the directory entry for the device. The source flag is set by notification plug-in 26 and may be set to 0 if the change is initiated by the directory server, i.e. by a native application or by an LDAP client in workstation 13, or may be set to 1 if the change is initiated by the device. Each of these three types of devices, and how changes to the configuration of each of them may be made in the directory server will now be discussed with reference to FIG. 6.

Figure 6:
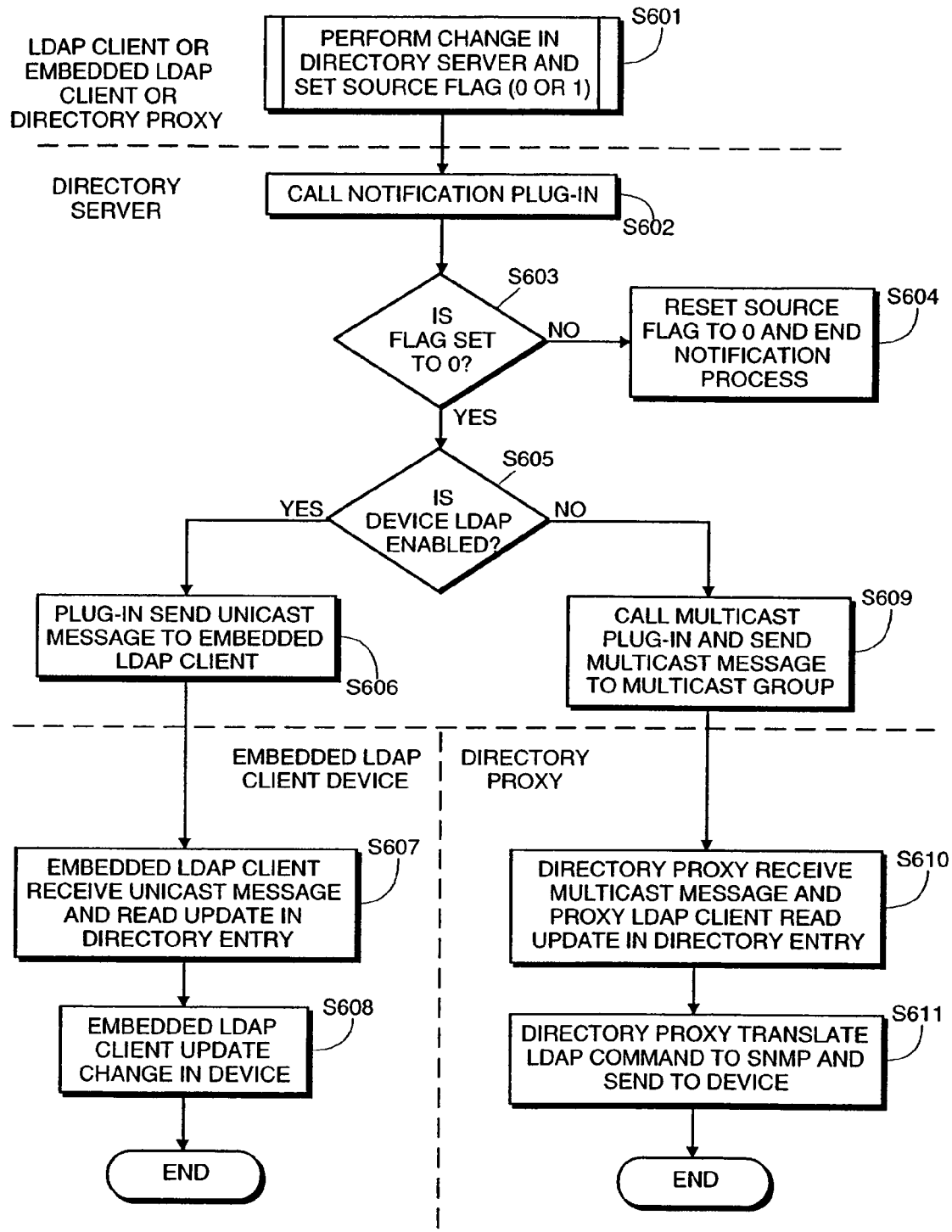
FIG. 6 is a flowchart of process steps for the management of changes to the configuration of the devices on the network of FIG. 1.

FIG. 6 depicts three possible scenarios of how changes may be initiated for each of the three device types. In one scenario, changes are initiated for a device with an embedded LDAP client. The changes for embedded LDAP client devices may be initiated by the embedded LDAP client in the device itself, or by the directory server, i.e. by an LDAP client in workstation 13 or by a native application in server 11. In a second scenario, changes are initiated for an SNMP device. The changes may be initiated by the SNMP device itself or by the directory server. In a third scenario, changes are initiated for a hybrid device. Again, the changes may be initiated by the device itself, in this case by either the SNMP client in the device or by the embedded LDAP client in the device, or the changes may be initiated by the directory server. Each of these three scenarios will now be discussed in more detail.

It should be noted that the following discussion generally describes changes being made to the configuration of devices for which an entry in directory server 25 already exists. However, it can readily be understood that other changes, such as deletion of devices from the network and addition of new devices to the network, would operate in a similar manner. Therefore, for the sake of brevity, only operations involving changes to the configuration of devices already existing on the network will be discussed. As stated above, changes in the configuration of each of the devices on the network could be initiated either by the device itself or by the directory server. In the following discussion, both of these will be discussed by presenting two examples, one with a network administrator changing the IP address of the device at the device itself, and the another with the network administrator changing the IP address of the device in the directory server.

The first type of device that will be discussed is a device with an embedded LDAP client, such as printer 14. Printer 14 includes an embedded LDAP client and does not include an SNMP client. As such, it is a pure LDAP enabled device and is not a hybrid device. As previously discussed with regard to FIG. 2, the embedded LDAP client communicates directly with the directory server via the LDAP protocol. Therefore, changes in the configuration of the device are communicated between the device and the directory server directly via LDAP, without the need for a translator.

FIG. 6 depicts a flowchart of process steps of how changes in each of the three types of devices are managed, including how changes in a device with an embedded LDAP client are managed. In the first example of the embedded LDAP client scenario, the administrator changes the IP address utilizing the embedded LDAP client in printer 14 itself.

In the first example, in step S601 the administrator performs a process utilizing the embedded LDAP client in printer 14 to change the IP address in printer 14. When the change has been committed to printer 14 by the embedded LDAP client, the embedded LDAP client initiates communication with directory server 25 via the LDAP protocol. Once communication has been established, the embedded LDAP client self publishes the change to the directory server utilizing an LDAP_MODIFY command. The embedded LDAP client also sets the source flag to 1. When the change has been committed to directory server 25, notification plug-in 26 is called (step S602).

Once the change has been committed to the directory server, in step S603, the directory server notification plug-in 26 looks at the source flag to determine what notification process is to be performed. If the flag is set to 1, then notification plug-in 26 knows that the change was initiated by the device and that it does not need to notify the device of the change. Therefore, in the present example flow proceeds to step S604 whereby notification plug-in 26 resets the source flag to 0 and the notification process ends.

In the second example of the embedded LDAP client scenario, the administrator changes the IP address of printer 14 in directory server 25 utilizing an LDAP client at client workstation 13. To make the change, the administrator activates the LDAP client application at workstation 13. The LDAP client application is configured to access directory server 25 and more particularly, to access the objectclass that contains printer 14. Once the LDAP client has been configured, the LDAP client establishes communication with directory server 25 via the LDAP protocol. Once communication has been established, the LDAP client application presents the administrator with a display of the directory structure for the objectclass that contains printer 14 on a display of client workstation 13. Utilizing the LDAP client at workstation 13, the administrator changes the IP address of printer 14 in directory server 25 (step S601). The LDAP client application also sets the source flag to 0. When the change has been made, the directory server calls notification plug-in 26 (step S602).

In step S603, notification plug-in 26 determines if the source flag is set to 0. In the present example, the source flag is set to 0 and therefore flow proceeds to step S605. In step S605, notification plug-in 26 looks at the directory entry for printer 14 to determine if the device is LDAP enabled. This determination is performed in order for the notification plug-in to determine whether it is to send a unicast message to the LDAP enabled device, or if it is to call one of the multicast plug-ins for sending a multicast message to be received by the directory proxy. If the notification plug-in determines that the device is LDAP enabled, and in the present example printer 14 is LDAP enabled since it has an embedded LDAP client, then flow proceeds to step S606.

In step S606, notification plug-in 26 generates a unicast message to inform the embedded LDAP client of printer 14 that a change has been made in the directory entry of directory server 25 for printer 14. The unicast message sent by notification plug-in 26 is merely a notification to the embedded LDAP client that a change has occurred and does not contain any specific information about the change itself. Upon receiving the unicast message, the embedded LDAP client of printer 14 establishes communication with directory server 25 and reads the directory entry to obtain the change information (step S607). Having obtained the change information, the embedded LDAP client then updates the configuration of the device (step S608) and the process is complete.

As a result of the foregoing second example, the IP address of printer 14 was changed in the directory server by an LDAP client in workstation 13, a notification plug-in in the directory server notified the embedded LDAP client in printer 14 that a change has occurred in the directory server, and the embedded LDAP client read the change information in the directory server and updated the configuration of printer 14.

In the second scenario, a pure SNMP device will be discussed. FIG. 6 also depicts process steps for how changes in SNMP devices are managed. Before describing examples of changes for SNMP devices, however, a more detailed description will be made of how the directory proxy obtains information about SNMP devices on the network, including obtaining information on startup (SNMP device discovery module 61 and it associated flowchart of FIG. 7) and obtaining updates to all SNMP devices on the network (SNMP monitoring/polling module 62 and its associated flowchart of FIG. 8).

Figure 7:
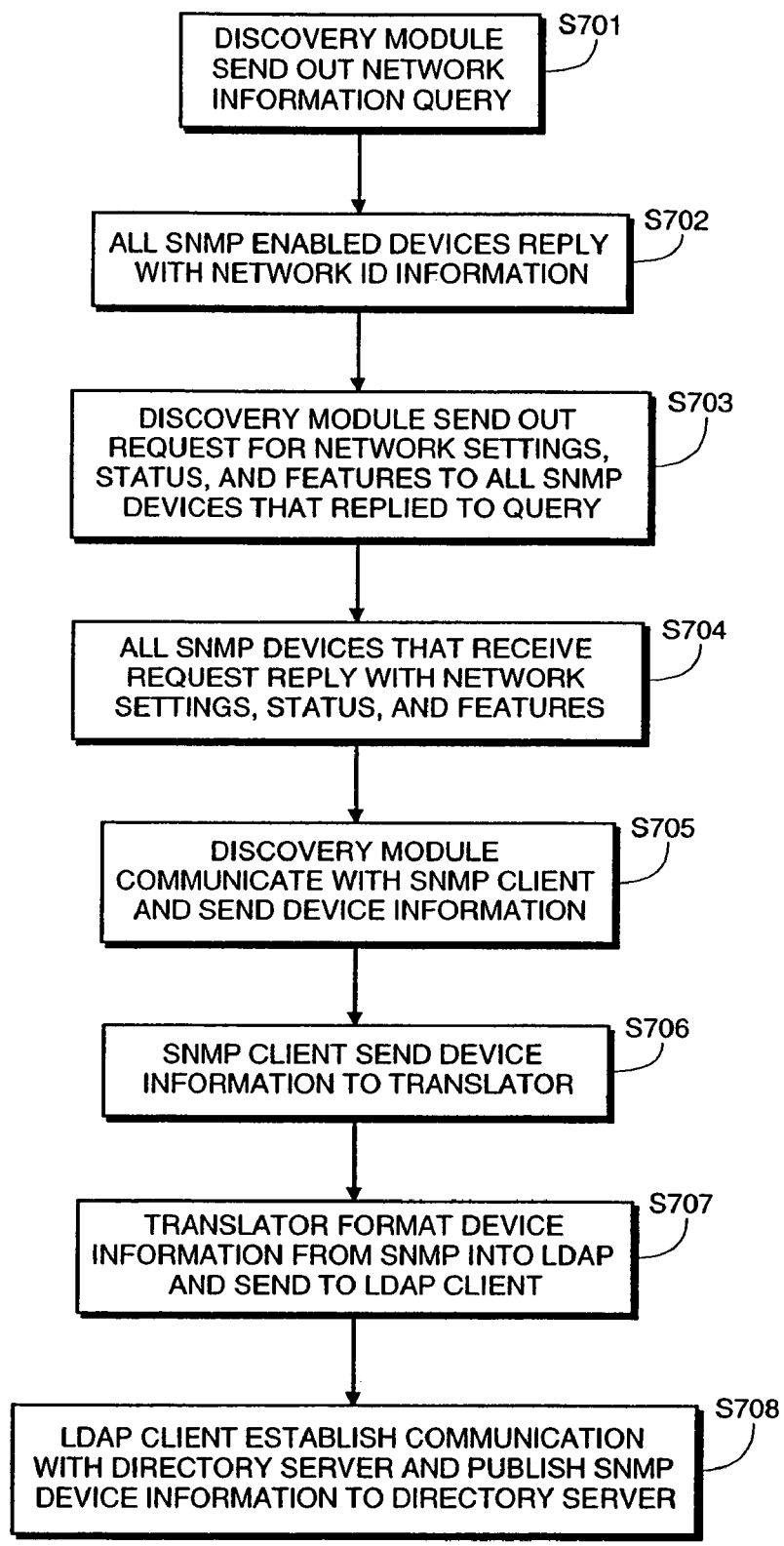
FIG. 7 is a flowchart of process steps for a discover module of a directory proxy.

In FIG. 7, SNMP device discovery module 61 generally obtains network information about all SNMP enabled devices on the network and then the information is processed through the directory proxy to the directory server. Discovery module 61 obtains the network information from the devices either on startup of the directory proxy or during periodic polling operations for new devices. When the directory proxy is started, discovery module 61 detects all SNMP devices on the network. To detect SNMP devices on the network, discovery module 61 sends out a query (SNMP_QUERY) for network identification information about all SNMP devices on the network (step S701). All SNMP enabled devices on the network submit a reply to the query to discovery module 61 (step S702). The reply from the SNMP enabled devices includes network identification information such as the device's IP address, device type, model, Mac address, device name, and MIB board type.

When discovery module 61 receives the reply from each device, it utilizes the network identification information of each device and sends out SNMP_GET commands to each of the devices that replied to the query (step S703). The SNMP_GET commands are sent to the SNMP devices to obtain information from the SNMP device's MIB, such as the network settings of the device, the status of the device and features of the device. Each SNMP device that receives the request reply with the requested information to discovery module 61 (step S704). Upon receiving the requested information, discovery module 61 then communicates with SNMP client 63 and sends the SNMP device's information to SNMP client 63 (step S705). SNMP client 63 then sends the SNMP device's information to LDAP/SNMP translator 64 (step S706). Translator 64 formats the device's information into LDAP format, communicates with LDAP client 60 and sends the LDAP formatted SNMP device's information to LDAP client 60 (step S707). LDAP client 60 then establishes communication with directory server 25 to self publish the SNMP device's information to the directory server (step S708). LDAP client 60 first utilizes an LDAP_ADD command to attempt to add the SNMP device's information in directory server 25. If an entry for the SNMP device is already present in directory server 25, then an error message is returned by the directory server to LDAP client 60. LDAP client 60 then utilizes an LDAP_MODIFY command to replace the directory entry information in the directory entry of directory server 25 for the existing device.

Thus, changes can be initiated by the directory proxy on startup if a new device is detected on the network, or if the configuration of an existing device is changed prior to the directory proxy being started. This process of performing changes by the directory proxy on startup results in the same device management operations as if a change is initiated in the device. Therefore, the discussion below regarding changes initiated in the device and the monitoring/polling module applies equally to changes that are initiated by the directory proxy's discovery module.

Figure 8:
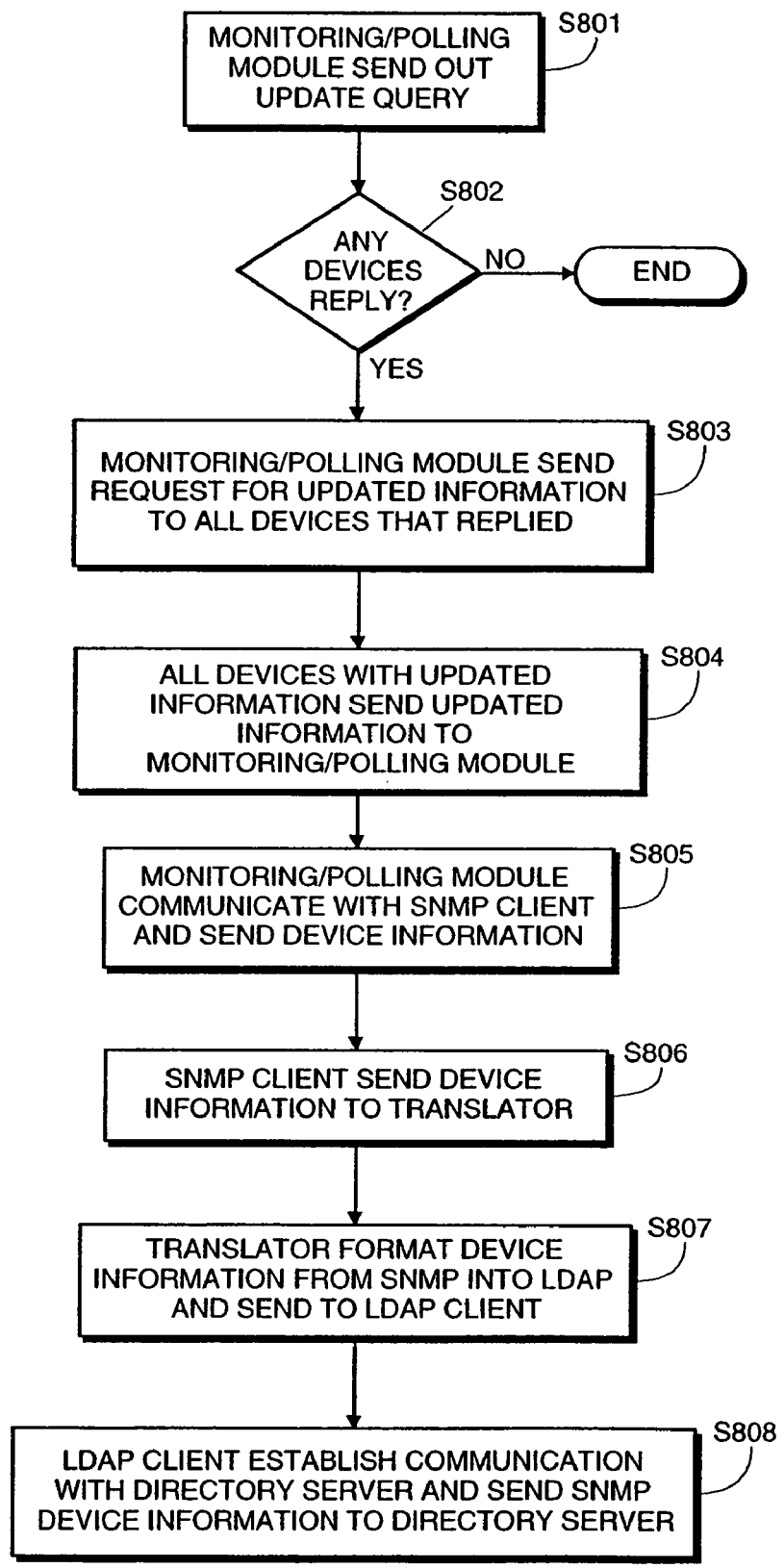
FIG. 8 is a flowchart of process steps for a monitoring/polling module of a directory proxy.

FIG. 8 depicts process steps performed by SNMP device monitoring/polling module 62. SNMP device monitoring/polling module 62 may operate in one of two modes, monitoring or polling. In a polling mode, module 62 generally performs periodic queries on the network to determine if any of the SNMP devices have been updated. In this mode, after startup of directory proxy 29 and after discovery module 61 has completed its processing, monitoring/polling module 62 may perform periodic polling operations by sending out a change query message for updated information. For instance, module 62 may be configured to perform a polling operation every one second to query for selected MIB data updates from all of the SNMP devices detected on the network (step S801). If no updates have been performed, then none of the devices respond and the process ends after a set time-out period. If the configuration of any of the devices has been changed, then upon receiving the query, only those devices on the network which have been updated reply to the query with a change information reply indicating to monitoring/polling module 62 that a change has been made (step S802). Upon receiving the change information reply message, module 62 then sends a request for the updated information to each device that replied (step S803). When the SNMP device receives the request, it sends the updated information to module 62 (step S804). Then, like module 61, module 62 sends the information to SNMP client 63 (step S805), SNMP client 63 sends the information to LDAP/SNMP translator 64 (step S806) which formats the SNMP information into LDAP and sends the LDAP formatted information to LDAP client 60 (step S807), with LDAP client 60 establishing communication with directory server 25 and self publishing the change in the directory server (step S808).

Rather than polling the network for updates, monitoring/polling module 62 could also monitor the network to listen for update messages from all SNMP devices on the network regarding updates. In this regard, each SNMP device on the network could send out a message on the network when a change has been made in the device. Module 62 listens for the update messages and upon receiving a message, performs a request for the device that sent out the message to reply with the updated information. In this manner, steps S803 to S808 would be performed in the same manner as described above, with steps S801 and S802 merely being changed to listen for messages rather than polling the network for updates.

Returning now to the description of FIG. 6, changes in SNMP devices and directory proxy 29 will now be discussed.

As described above with regard to FIG. 7, upon startup of directory proxy 29, discovery module 61 obtains information about all devices on the network and the information is processed through directory proxy 29 to LDAP client 60. LDAP client 60 attempts to perform an LDAP_ADD operation in directory server 25, but receives an error message if an entry for the SNMP device is already present in the directory server. LDAP client 60 then performs an LDAP_MODIFY command to replace the directory entry of the SNMP device in the directory server (step S601). LDAP client 60 also sets the source flag to 1 for all SNMP devices that have been added or modified. Upon making the change in the directory server, notification plug-in 26 is called (step S602). Then, in step S603 notification plug-in 26 determines that the source flag is set to 1 and flow proceeds to step S604 where the notification plug-in resets the source flag to 0 and the process ends.

Next, an example where the IP address of an SNMP device, such as printer 16, has been changed at the device itself will be discussed. It will be assumed that the directory proxy has been started and that monitoring/polling module 62 is currently polling the network for updates. An administrator changes the IP address of printer 16 at the printer. After the change has been committed to printer 16, a polling operation of module 62 sends out an update query message on the network. Since the configuration of printer 16 has been updated, printer 16 replies with an update information reply message. Module 62 then sends a request to printer 16 for the updated information and printer 16 sends the updated information to module 62. Module 62 then sends the updated information to SNMP client 63, SNMP client 63 sends the information to LDAP/SNMP translator 64, and translator 64 formats the information from SNMP into LDAP and sends the LDAP information to LDAP client 60. LDAP client 60 establishes communication with directory server 25, performs the change in directory server 25 and sets the source flag to 1 (step S601). Then, notification plug-in 26 is called (step S602). In step S603, notification plug-in 26 determines that the source flag is set to 1 and therefore flow proceeds to step S604 where notification plug-in 26 resets the source flag to 0 and the process ends.

Thus, the configuration of an SNMP enabled device is changed at the device itself, the change is detected by the directory proxy by polling the network for updated information, and the change is performed in the directory server by the LDAP client of the directory proxy. A description will now be made of a change to the IP address of an SNMP enabled device (printer 16) being made in the directory server utilizing an LDAP client application in client workstation 13.

The IP address for printer 16 is changed in directory server 25 utilizing the LDAP client of workstation 13 in the same manner described above with reference to the IP address being changed for embedded LDAP client printer 14. Therefore, the discussion of the change being made in the directory server and the source flag being set to 0 (step S601) will not be repeated here.

Once the IP address for printer 16 has been committed in the directory server, notification plug-in 26 is called (step S602). Then, in step S603 notification plug-in 26 determines that the flag has been set to 0 in step S601 and therefore it knows that it needs to notify the device of the change and flow proceeds to step S605. In step S605, notification plug-in 26 determines from the directory entry for printer 16 that printer 16 is an SNMP enabled device and that it does not include an embedded LDAP client. Therefore, flow proceeds to step S609 where notification plug-in 26 calls one of multicast plug-ins 40 to 43, depending on the type of change operation made in the directory server. In the present case, MODIFY plug-in 42 is called since a modify operation has been performed in directory server 25. MODIFY plug-in 42 generates an information packet and multicasts it to multicast group 47. All registered members of multicast group 47 receive the information packet. In this regard, directory proxy 29, and possibly other directory proxies on the network, register as members of multicast group 47 and therefore receive the information packet from the multicast plug-in (step S610). As such, directory proxy 29 may monitor the network for multicast messages about changes made in directory server 25. The multicast message generally includes information that a change has been made and directory entry identification information of which directory entry was changed.

Upon receiving the multicast message, LDAP client 60 of directory proxy 29 establishes communication with directory server 25 and reads the updated directory entry (step S610). Upon obtaining the updated information, LDAP client 60 sends the information to LDAP/SNMP translator 64 where the updated information is formatted into SNMP and then sent to SNMP client 63 (step S611). SNMP client 63 communicates the updated information to printer 16 (step S611) where the new IP address is set in the MIB of printer 16.

Thus, as described above, changes in the configuration of SNMP devices on the network are made in the directory server, the directory server notification plug-in calls a multicast plug-in that sends out a multicast message that is received by the directory proxy, the LDAP client of the directory proxy communicates with the directory server, reads the updated information and sends it to the translator in the directory proxy, the translator formats the information from LDAP into SNMP and sends it to the SNMP client in the directory proxy, and the SNMP client sends the information to the SNMP device where the new information is updated in the device.

In the third scenario, i.e. a hybrid SNMP enabled and LDAP enabled device such as printer 15, two examples will be discussed: one where changes are initiated in the directory server, and another where changes are initiated at the device itself.

As previously discussed with regard to FIG. 2, a hybrid device communicates directly with the directory server via LDAP and also communicates with the directory server via the directory proxy (SNMP). Therefore, the flow of communication in hybrid devices may include parallel processes (LDAP and SNMP) being performed at the same time. For example, during the discovery mode when printer 15 is first connected to the network, during startup of the directory proxy or during periodic polling operations of discovery module 61 for new devices, printer 15 may attempt to communicate with the directory server via two communication protocols, LDAP and SNMP. In this scenario, both protocols perform parallel processes to attempt to add an entry to the directory server for the new device at the same time.

For instance, printer 15 includes an embedded LDAP client that, when printer 15 is connected to the network, the embedded LDAP client establishes communication with directory server 25 and attempts to add a new directory entry for printer 15. However, printer 15 also communicates with directory proxy 29 via SNMP and therefore, when the new device is connected to the network, discovery module 61 in directory proxy 29 detects the new device and obtains the device's SNMP information as described above with regard to FIG. 7. Then, LDAP client 60 of directory proxy 29 establishes communication with directory server 25 and attempts to add a new directory entry for printer 15.

In this scenario where parallel processes are being performed, i.e. both LDAP and SNMP, the process that establishes communication with the directory server first is the process that performs the ADD operation and the other process is managed, as will be described below, by the notification plug-in logic. That is, the notification plug-in in the directory server controls the management of hybrid devices. Therefore, if the embedded LDAP client in printer 15 establishes communication with directory server 25 first, it publishes the new entry for printer 15 in directory server 25. Then, when LDAP client 60 establishes communication with directory server 25 and attempts to perform an LDAP_ADD operation, it receives an error message because the embedded LDAP client in printer 15 has already added the directory entry. Therefore, LDAP client 60 performs an LDAP_MODIFY operation to change the directory entry. As such, the notification plug-in in directory server 25 sees that the source flag has been set to 1 and does not perform further processing to notify printer 15 of the change by directory proxy 29.

However, if LDAP client 60 of directory proxy 29 establishes communication with directory server 25 first, it adds the new directory entry for printer 15. Then, when the embedded LDAP client of printer 15 establishes communication with directory server 25, it performs the change and the notification plug-in sees that the source flag is 1 and therefore it does not perform further processing to change notify the device of the change.

Changes in the configuration of hybrid printer 15 may also be made to the directory entry in directory server 25 utilizing an LDAP client in client workstation 13 or a native application program in server 11 as described above. The process for making changes in the configuration of printer 15 utilizing the LDAP client of workstation 13 or a native application is the same as that described above for the embedded LDAP client printer and the SNMP printer and therefore, this process will not be repeated here. When the change is made in the directory entry of directory server 25 in step S601 the source flag is set to 0 and notification plug-in 26 is called (step S602). Notification plug-in 26 determines in step S603 that the source flag is set to 0, and determines in step S605 that printer 15 is LDAP enabled by referring to the directory entry. Since notification plug-in 26 detects that printer 15 is LDAP enabled, notification plug-in 26 unicasts a message to the embedded LDAP client in printer 15 (step S606). The remaining process is the same as described above for printer 14 in that the embedded LDAP client of printer 14 establishes communication with directory server 25 and reads the changed information (step S607), and the embedded LDAP client performs the change in printer 15 (step S608).

However, because printer 15 is a hybrid device, once the change is made in the-configuration of printer 15 by the embedded LDAP client, directory proxy 29 detects the change via monitoring/polling module 62. Upon detecting the change, module 62 then operates as described above to obtain the updated information from printer 15 and the updated information is processed through directory proxy 29 to LDAP client 60. LDAP client 60 in directory proxy 29 establishes communication with the directory server 25 and may update the directory entry. In this regard, directory proxy 29 may be configured to recognize LDAP enabled devices and to not perform further processing for these devices. That is, if directory proxy recognizes that a device is a hybrid device, it may be configured so that when it detects a change in a hybrid device, it allows the LDAP client to handle the change and the directory proxy does attempt to perform the change. On the other hand, directory proxy 29 may overwrite the directory entry even if it has already been made by the LDAP client. In this case, the source flag is set to 1 by the directory proxy when it makes the change. When notification plug-in 26 sees that the source flag is set to 1, flow proceeds to step S604 where notification plug-in 26 resets the source flag to 0 and the notification process ends.

Updates in the configuration of printer 15 may also be made at printer 15 itself. In this case, the update is performed in the same manner described above for updates in embedded LDAP client devices. As described above, the embedded LDAP client establishes communication with the directory server and the LDAP client self publishes the change in the directory entry. Upon committing the change to the directory server, the embedded LDAP client set the source flag to 1. Then, notification plug-in 26 is called in step S602. In step S603, notification plug-in 26 determines that the source flag is set to 1 and flow proceeds to step S604 where the plug-in resets the flag to 0 and the notification process ends.

When the change is made in printer 15 utilizing its embedded LDAP client, monitoring/polling module 62 of directory proxy 29 detects the change and obtains the changed information, whereby it is processed through directory proxy 29 to LDAP client 60. Again, directory proxy 29 may be configured to ignore changes in LDAP enabled devices. However, in a case where directory proxy 29 processes the change, LDAP client 60 establishes communication with directory server 25, publishes the change again and sets the source flag to 1. Notification plug-in 26 is called (step S602) and detects that the source flag is set to 1 (step S603). Therefore, notification plug-in 26 resets the source flag to 0 and the process ends (step S604).

Thus, for hybrid devices, changes made at the device are communicated to the directory server via the embedded LDAP client, and in some cases the directory proxy detects the change made by the embedded LDAP client and performs the change again. In other cases, the directory proxy detects the change but determines that the device is LDAP enabled and therefore allows the LDAP client to handle the change. For changes made in the directory server, the change is communicated to the hybrid device via the embedded LDAP client and the directory proxy detects the change and either allows the LDAP client to handle the change or performs the change again.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for managing a plurality of network devices on a network, said method comprising the steps of:
   detecting the presence of at least one network device of the plurality of network devices by using a first communication protocol sent over a network communication protocol, wherein said first communication protocol is a protocol that corresponds to a layer higher than that of said network communication protocol, and is adapted for obtaining information related to a device from the device and for sending data to be set in the device to the device;
   obtaining information related to said one network device from said one network device, wherein the information is obtained from said one network device by using said first communication protocol sent over said network communication protocol;
   formatting the obtained information into a directory entry;
   sending the directory entry to a directory server by using a second communication protocol sent over said network communication protocol, wherein said second communication protocol is a protocol that corresponds to a layer higher than that of said network communication protocol, and is adapted for sending a directory entry to a directory server and for obtaining a directory entry from the directory server;
   monitoring for issuance of an update message from the directory server indicating that a directory entry has been updated in the directory server;
   obtaining, in the case that an update message is issued, the updated directory entry from the directory server by using said second communication protocol sent over said network communication protocol;
   extracting updated data from the updated directory entry; and
   sending the updated data to a network device which corresponds to the updated directory entry by using said first communication protocol sent over said network communication protocol,
   wherein the updated data is set in the corresponding network device, wherein the directory entry is formatted according to a standardized schema, and wherein the standardized schema of the directory entry includes a source-flag to indicate the source of the directory entry.

2. A method according to claim 1 wherein the step for detecting the presence of at least one of the plurality of network devices on the network includes:
   sending a broadcast query message by using said first communication protocol sent over said network communication protocol; and
   receiving a reply message by using said first communication protocol sent over said network communication protocol from each of the plurality of network devices that supports the first communication protocol,
   wherein the reply message contains network identification information related to the corresponding network device that sent the reply message.

3. A method according to claim 2 wherein the step for obtaining information from the detected network device includes:
   sending an information request message by using said first communication protocol sent over said network communication protocol to the detected network device; and
   receiving an information response message by using said first communication protocol sent over said network communication protocol from the detected network device in response to the information request message, the information response message containing the information from the detected network device,
   wherein the information request message contains the network identification information related to the corresponding detected network device.

4. A method according to claim 1 wherein the information from the detected network device contains network-related information, feature information and status information for the corresponding network device.

5. A method according to claim 1 wherein each directory entry is formatted according to the standardized schema and a schema extension.

6. A method according to claim 1 wherein the step of sending the directory entry to the directory server includes sending an entry-addition message by using said second communication protocol sent over said network communication protocol to the directory server for the directory entry, wherein the entry-addition message contains the corresponding directory entry.

7. A method according to claim 6 wherein, in the case that an error message is received from the directory server in response to the entry-addition message which indicates that a directory entry already exists for the corresponding network device, an entry-modify message is sent by using said second communication protocol sent over said network communication protocol to the directory server to replace the directory entry for the corresponding network device.

8. A method according to claim 1 wherein the source-flag is set to a high state to indicate that the directory entry contains information obtained from the corresponding network device.

9. A method according to claim 1 further comprising the steps of:
monitoring each of the detected network devices for an update of the information of the network device, wherein said monitoring step monitors by using said first communication protocol sent over said network communication protocol; and
obtaining, in the case that the information of one of the detected network devices has been updated, the updated information from the corresponding network device by using first communication protocol sent over said network communication protocol; and
sending the updated information to the directory server by using second communication protocol sent over said network communication protocol for placement into the directory entry for the corresponding network device.

10. A method according to claim 9 wherein the step of monitoring each of the detected network devices for an update includes:
sending, on a frequent basis, a change query message by using said first communication protocol sent over said network communication protocol to each detected network device; and
receiving a change indication message by using said first communication protocol sent over said network communication protocol, in reply to one of the change query messages, from each detected network device in which the information has changed.

11. A method according to claim 10 wherein the step of obtaining the updated information from the corresponding network device includes:
sending an information request message by using said first communication protocol sent over said network communication protocol to each detected network device for which a change indication message was received; and
receiving an information response message by using said first communication protocol sent over said network communication protocol from each detected network device to which an information request message was sent, the information response message containing the information from the corresponding detected network device,
wherein the information request message contains the network identification information related to the corresponding detected network device.

12. A method according to claim 1 wherein the step of monitoring for issuance of an update message from the directory server includes:
monitoring the network for issuance of a multicast message which indicates the identity of a directory entry that has been updated in the directory server.

13. A method according to claim 12 wherein the multicast message is issued from a directory plug-in module which interfaces with the directory server and which monitors the directory server for detecting when a directory entry is updated.

14. A method according to claim 12 wherein the step of obtaining the updated directory entry from the directory server includes:
sending an entry-query message by using said second communication protocol sent over said network communication protocol to the directory server, wherein the entry-query message contains the identity of the updated directory entry; and
receiving an entry-return message by using said second communication protocol sent over said network communication protocol from the directory server, wherein the entry-return message contains the updated directory entry,
wherein sending the updated data to the network device which corresponds to the updated directory entry includes sending an information update message by using said first communication protocol sent over said network communication protocol to the corresponding network device.

15. A method according to claim 1 wherein the method is performed in a directory proxy software module.

16. A method according to claim 1 wherein the source-flag in each directory entry is utilized by a directory plug-in module which interfaces with the directory server and which monitors the directory server for detecting when a directory entry is updated,
wherein, in the case that an updated directory entry is detected and the corresponding source-flag of the updated directory entry is set to a low state, the directory plug-in module sends a multicast message over the network which indicates that an updated directory entry has been detected, and
wherein, in the case that an updated directory entry is detected and the corresponding source-flag of the updated directory entry is set to a high state, the directory plug-in module resets the source-flag of the updated directory entry to the low state.

17. A directory-enabled network device for managing a plurality of network devices on a network, comprising:
a program memory for storing executable process; and
a processor for executing the executable process steps stored in said program memory;
wherein said executable process steps comprise steps for:
(a) detecting the presence of at least one network device of the plurality of network devices by using a first communication protocol sent over a network communication protocol, wherein said first communication protocol is a protocol that corresponds to a layer higher than that of said network communication protocol, and is adapted for obtaining information related to a device from the device and for sending data to be set in the device to the device,
(b) obtaining information related to said one network device from said one network device, wherein the information is obtained from said one network device by using said first communication protocol sent over said network communication protocol,
(c) formatting the obtained information into a directory entry,
(d) sending the directory entry to a directory server by using a second communication protocol sent over said network communication protocol, wherein said second communication protocol is a protocol that corresponds to a layer higher than that of said network communication protocol, and is adapted for sending a directory entry to a directory server and for obtaining a directory entry from the directory server, (e) monitoring, for issuance of an update message from the directory server indicating that a directory entry has been updated in the directory server, (f) obtaining, in the case that an updated message is issued, the updated directory entry from the directory server by using said second communication protocol sent over said network communication protocol, (g) extracting updated data from the updated directory entry, and (h) sending the updated data to a network device which corresponds to the updated directory entry by using said first communication protocol sent over said network communication protocol, wherein the updated data is set in the corresponding network device, wherein the directory entry is formatted according to standardized schema, and wherein the standardized schema of the directory entry includes a source-flag to indicate the source of the directory entry.

18. Computer-executable process steps stored on a computer readable memory medium, said computer-executable process steps for managing a plurality of network devices on a network, said computer-executable process steps comprising:

detecting the presence of at least one network device of the plurality of network devices by using a first communication protocol sent over a network communication protocol, wherein said first communication protocol is a protocol that corresponds to a layer higher than that of said network communication protocol, and is adapted for obtaining information related to a device from the device and for sending data to be set in the device to the device;

obtaining information related to said one network device from said one network device, wherein the information is obtained from said one network device by using said first communication protocol sent over said network communication protocol;

formatting the obtained information into a directory entry;

sending the directory entry to a directory server by using a second communication protocol sent over said network communication protocol, wherein said second communication protocol is a protocol that corresponds to a layer higher than that of said network communication protocol, and is adapted for sending a directory entry to a director server and for obtaining a directory entry from the directory server;

monitoring, for issuance of an update message from the directory server indicating that a directory entry has been updated in the directory server;

obtaining, in the case that an update message is issued, the updated directory entry from the directory server by using said second communication protocol sent over said network communication protocol;

extracting updated data from the updated directory entry; and sending the updated data to a network device which corresponds to the updated directory entry by using said first communication protocol sent over said network communication protocol, wherein the updated data is set in the corresponding network device, wherein the directory entry is formatted according to a standardized schema, and wherein the standardized schema of the directory entry includes a source-flag to indicate the source of the directory entry.

19. A method comprising the steps of:

obtaining, at a proxy device, information related to one network device from said one network device, wherein the information is obtained from the device by using a first communication protocol sent over a network communication protocol, and wherein said first communication protocol is a protocol that corresponds to a layer higher than that of said network communication protocol, and is adapted for obtaining information related to a device from the device and for sending data to be set in the device to the device;

formatting, at the proxy device, the obtained information into a directory entry;

sending, from the proxy device, the directory entry to a directory server by using a second communication protocol sent over said network communication protocol, wherein said second communication protocol is a protocol that corresponds to a layer higher than that of said network communication protocol, and is adapted for sending a directory entry to a directory server and for obtaining a directory entry from the directory server;

obtaining, at the proxy device, in the case that a directory entry corresponding to said one network device has been updated in the directory server, the updated directory entry from the directory server by using said second communication protocol sent over said network communication protocol;

extracting, at the proxy device, update data from the updated directory entry; and sending, from the proxy device, the updated data to a network device which corresponds to the updated directory entry by using said first communication protocol sent over said network communication protocol, wherein the updated data is set in said network device.

20. A method according to claim 19 further comprising the steps of:

detecting the presence of said one network device on the network by using said first communication protocol sent over said network communication protocol, wherein in said obtaining step, the information related to the detected network device is obtained.

21. A method according to claim 20 wherein the step for detecting the presence of said one network device includes:

sending a broadcast query message by using said first communication protocol sent over said network communication protocol; and receiving a reply by using said first communication protocol sent over said network communication protocol from said one network device that supports the first communication protocol, wherein the reply message contains network identification information related to said one network device.

22. A method according to claim 19 further including the steps of:

monitoring, by using said first communication protocol sent over said network communication protocol, said one network device for an update of the information of said one network device;

obtaining, in the case that the information of said one network device has been updated, the updated information from said one network device by using said first communication protocol sent over said network communication protocol; and sending the updated information to the directory server by using said second communication protocol sent over said network communication protocol for placement into the directory entry for said one network device.

23. A proxy device for communicating with at least one network device on a network, comprising:
- a program memory for storing executable process steps;
- a processor for executing the executable process steps stored in said program memory;
- wherein said executable process steps comprise steps for:
  - (a) obtaining information related to said one network device from said one network device, wherein the information is obtained from the device by using a first communication protocol sent over a network communication protocol, and wherein said first communication protocol is a protocol that corresponds to a layer higher than that of said network communication protocol, and is adapted for obtaining information related to a device from the device and for sending data to be set in the device to the device,
  - (b) formatting the obtained information into a directory entry,
  - (c) sending the directory entry to a directory server via the network by using a second communication protocol sent over said network communication protocol, wherein said second communication protocol is a protocol that corresponds to a layer higher than that of said network communication protocol, and is adapted for sending a directory entry to a directory server and for obtaining a directory entry from the directory server,
  - (d) obtaining, in the case that a directory entry corresponding to said one network device has been updated in the directory server, the updated directory entry from the directory server by using said second communication protocol sent over said network communication protocol,
  - (e) extracting updated data from the updated directory entry, and
  - (f) sending the updated data to said one network device which corresponds to the updated directory entry by using said first communication protocol sent over said network communication protocol, wherein the updated data is set in said network device.

24. Computer-executable process steps stored on a computer readable memory medium, said computer-executable process steps for causing a computer to implement a proxy device for communicating with at least one network device on a network, said computer-executable process steps comprising:
- obtaining information related to said one network device from said one network device, wherein the information is obtained from the device by using a first communication protocol sent over a network communication protocol, and wherein said first communication protocol is a protocol that corresponds to a layer higher than that of said network communication protocol, and is adapted for obtaining information related to a device from the device and for sending data to be set in the device to the device;
- formatting the obtained information into a directory entry;
- sending the directory entry to a directory server by using a second communication protocol sent over said network communication protocol, wherein said second communication protocol is a protocol that corresponds to a layer higher than that of said network communication protocol, and is adapted for sending a directory entry to a directory server and for obtaining a directory entry from the directory server;
- obtaining in the case that a directory entry corresponding to said one network device has been updated in the directory server, the updated directory entry from the directory server by using said second communication protocol sent over said network communication protocol;
- extracting updated data from the updated directory entry; and
- sending the updated data to said one network device which corresponds to the updated directory entry by using said first communication protocol sent over said network communication protocol, wherein the updated data is set in said network device.

* * * * *